Figure 1:
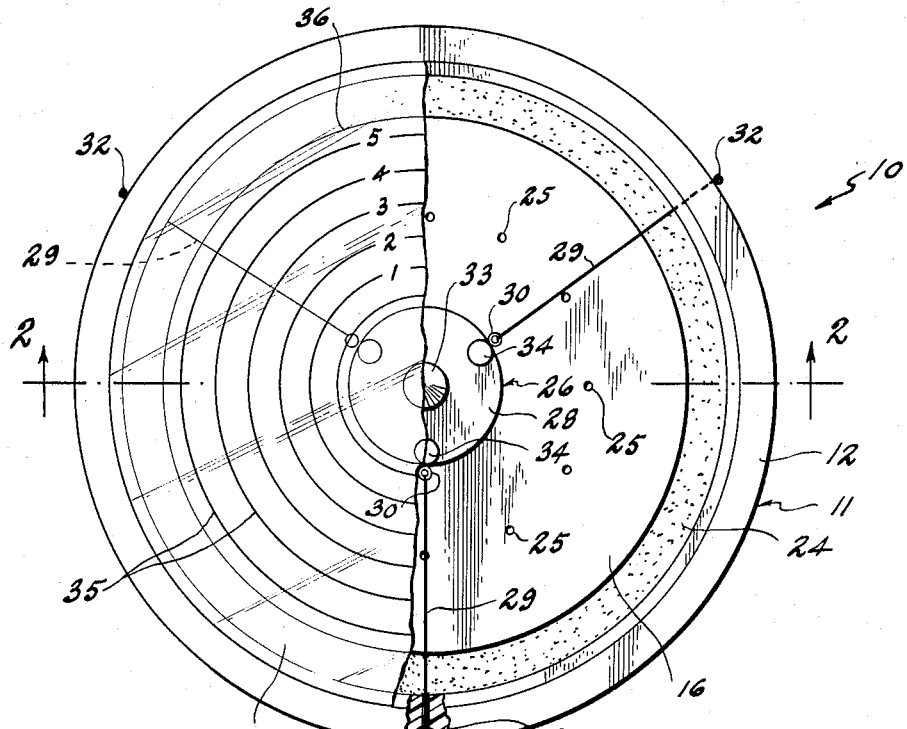

Nov. 23, 1965  R. H. BAKER  3,218,870
DEVICE FOR MEASURING ACCELERATIONS AND DECELERATIONS
Filed June 12, 1962

INVENTOR.
RICHARD H. BAKER
BY
Benjamin Sweedler
ATTORNEY.

United States Patent Office 3,218,870
Patented Nov. 23, 1965

3,218,870
DEVICE FOR MEASURING ACCELERATIONS AND DECELERATIONS
Richard H. Baker, 26 Wildwood Drive, Bedford, Mass.
Filed June 12, 1962, Ser. No. 201,946
4 Claims. (Cl. 73—492)

This invention relates to a device for measuring or indicating accelerations and decelerations which a vehicle or other object subjected to accelerating or decelerating forces may encounter.

It is among the objects of the present invention, to provide a device of simple and inexpensive construction which is nevertheless reliable and accurate in operation to indicate or measure accelerating and decelerating forces, for example, to indicate the extent of accelerating forces to which a vehicle, such as an automobile, is subjected when starting up or in motion, as well as the direction of such forces.

Another object of this invention is to provide a device capable of measuring or recording accelerations and decelerations in all horizontal directions, and further capable of indicating the direction, as well as the magnitude, of the acceleration or deceleration to which the vehicle or other moving object carrying the device has been subjected.

A further object is to provide a device of the described character providing a visual record of the measured accelerations and decelerations on a surface of the device, and wherein the records or indications of accelerations or decelerations can be easily erased from such surface and the latter restored to the condition for receiving visual records of subsequently measured accelerations or decelerations.

In accordance with this invention, a device for measuring accelerations and decelerations comprises an outer housing having a top closure of transparent or translucent material and containing powder, preferably aluminum oxide, adapted to adherently coat the under surface of the top closure when the housing is shaken; and a recording mechanism within the housing consisting of a metal sphere or ball of substantial mass rolling on a surface within the housing that is parallel to and spaced from the top, a casing for the ball for movement with the latter and carrying an upwardly projecting recording member desirably in the form of a tip or pointer in contact with the lower surface of the top to trace or scribe a visible line in the powder coating the latter, and elastic elements, such as rubber bands or metal springs, extending between the casing and the side walls of the housing to urge the casing to a centered position within the latter so that, when the vehicle or other moving object carrying the device is subjected to an acceleration or deceleration, the resulting forces acting on the massive metal ball effect displacement thereof and the casing carrying the recording member, from their normal centered position so that the recording member scribes a line in the powder coating on the underside of the top having a direction and length correspondnig to the direction and magnitude of the acceleration or deceleration.

In a preferred embodiment of the invention, the surface within the outer housing with which the massive ball effects rolling contact is adjustable toward and away from the top of the housing to permit adjustment of the contact pressure of the pointer or tip of the recording mechanism with the transparent or translucent top and further to permit secure retention of the recording mechanism in its initial centered position during shaking of the housing for recoating the top with the adherent powder.

Figure 2:
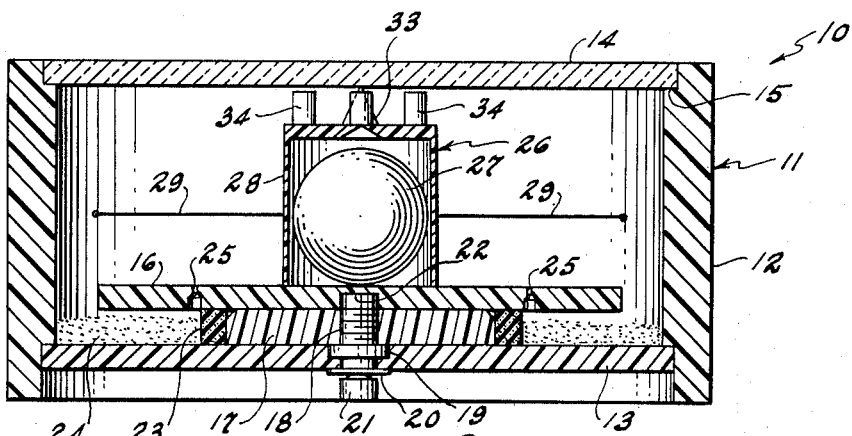

The above, and other objects, features and advantages of the invention, will be apparent from the following detailed description of an illustrative embodiment thereof which is to be read in connection with the accompanying drawing forming a part hereof, and wherein:

FIGURE 1 is a top plan view, partly broken away and partly in section, of a device for measuring accelerations and decelerations in accordance with the invention; and FIGURE 2 is a transverse sectional view taken along the line 2—2 on FIGURE 1.

Referring to the drawing, it will be seen that a device embodying the invention and there generally identified by the reference numeral 10 comprises an outer housing 11 having a side wall 12 which may be cylindrical or other desired shape and formed of a suitable material, for example, plastic materials, including phenolic resin impregnated cloth or paper. The base 13 of the housing is preferably upwardly recessed, as shown on FIGURE 2, and cemented or otherwise securely attached to the side wall. A transparent or translucent top 14 of glass, methyl methacrylate or other suitably strong material seats in an annular recess 15 provided at the top edge of side wall 12. This top is cemented or otherwise secured and sealed with respect to the side wall in the assembly of the device 10.

A support or table 16 is mounted within housing 11 above base 13 and has its periphery spaced substantially inward from the inner surface of side wall 12. The support or table 16 can be formed of any suitable material such as hard, smooth plastic material, including phenolic resin impregnated cloth or paper, and lies in a plane parallel to that of the top 14.

Support or table 16 rests on a disk 17 (FIG. 2) bonded to the underside of support 16 and, as shown in FIGURE 2 of somewhat smaller cross-sectional area. A screw 18 is rotatably mounted in a central, counter-bored hole in base 13 and held against axial displacement relative to the latter by a collar 19 formed on the screw and a split washer 20 removably received in a circumferential groove in screw 18 and engaging against the underside of wall 13. The head 21 of screw 18 is accommodated within the recess provided at the bottom of housing 11, and the threaded portion of screw 18 is received in a central tapped bore provided in disk 17. Screw 18 further has a smooth or unthreaded upper end portion rotatably received in a blind bore or recess 22 located centrally in the bottom surface of support 16. Thus, when screw 18 is manually turned, disk 17 and support 16 move vertically relative to base 13, thereby to adjust the distance between the top surface of support or table 16 and the lower surface of top wall 14.

A resilient ring 23, which may be formed of polyurethane foam, sponge rubber, or other suitable compressible and expansible material, extends around the periphery of disk 17 between support or table 16 and bottom wall 13 and has a normal height greater than the thickness of disk 17. Hence vertical displacements of the latter vary the compression of ring 23 which serves to take up and accommodate any adjustment made of the position of support 16 relative to the top 14, and further to provide a seal between disk 17 and base 13.

Housing 11 contains adherent powder 24 disposed in the annular space between ring 23 and side wall 12 and between base 13 and support 16. The amount of powder is more than enough to form an adherent film on the underside of top 14 when this device is shaken. The powder 24 is prevented from entering the threads of screw 18 by the previously mentioned sealing action of ring 23. The support or table 16 is preferably formed with a circularly arranged series of holes 25 extending therethrough at radial locations disposed outside of the ring 23 so that, when the housing 11 is shaken, the powder 24 passes through holes 25 and through the annular gap defined between the periphery of support 16 and side wall 12 is provide an adherent coating of powder on the under surface of top 14. A suitable powder is powdered aluminum oxide or talc. In order to prevent caking or compacting of the powder, small solid pellets or beads of glass or metal are preferably mixed with the powder so that, upon shaking of the housing, such solid pellets or beads will break up any caked masses or large agglomerates of the powder.

A recording mechanism 26 includes a metal ball or sphere 27, desirably a steel ball having, for example, a mass of about 250 grams, positioned to roll of the top surface of support or table 16. The ball 27 is disposed within a casing 28 which may have an inverted cup-like configuration, as shown, and which slides on table 16. Casing 28 is dimensioned to snugly receive the ball 27. It may be of plastic, including phenolic resin impregnated cloth or paper. Elastic elements 29 extend radially between casing 28 and the side wall 12 of housing 11 to yieldably urge recording mechanism 26 to a central position within the housing. The elastic elements 29 may be in the form of helical tension springs. However, in the particularly simple structural embodiment of the invention illustrated in the drawing, the elastic elements 29 are in the form of rubber bands which are equally spaced apart, 120°, and have their inner ends fastened to eyes 30 secured to casing 28 while the outer end portions of the rubber bands extend through small radial holes 31 (FIGURE 1) in side wall 12 and are knotted, as at 32, at the outside of the side wall. These elastic elements, as shown in FIGURE 2, are positioned to engage the casing 28 at spaced points on the transverse median and are disposed in substantially the same horizontal plane so that the casing is normally centered with substantially the same forces exerted on all sides of its periphery tending to maintain it centered relative to the housing 11.

Tip or pointer 33, desirably conical and of rubber or other flexible material, extends upwardly from the center of the top of casing 28 and is adapted to slidably contact the lower surface of top 14. Three equally spaced apart posts 34 of rubber or other suitable material, project upwardly from the top of casing 28 and have a height less than the normal height of the central tip 33, so that during operation of the device 10, the posts 34 are normally spaced from top 14, to provide a small clearance between the upper ends of these posts and the underside of the top 14. These posts serve to maintain casing 28 in fixed position during formation of the powder layer on the under side of top 14, as explained more fully hereinafter.

As shown on FIGURE 1, the top 14 is preferably provided with a series of concentric lines 35 which are radially spaced apart and provided with suitably calibrated identifying indicia 36 for indicating the magnitude of the accelerations and decelerations to which the device 10 is subjected, as hereinafter described in detail. Top 14, while preferably transparent, can be of any suitable material through which the marking made on the under surface is visible.

The above described device 10 operates as follows:

Initially, screw 18 is turned in the direction for moving support 16 toward top 14 and thereby engage posts 34 with the latter and compress the rubber tip 33. With the recording mechanism 26 thus firmly held in position, the housing 11 is shaken so that the powder 24 forms a uniform coating on the under surface of top 14. The screw 18 is then turned in the reverse direction to free posts 34 from top 14, while maintaining light contact of the rubber tip 33 with the coated under surface of the top 14. The device 10 is positioned in a vehicle or other object, with the bottom of its housing 11 disposed generally in a plane parallel to that of the accelerations and decelerations which are to be measured. Thus, for example, it may be placed on the floor or seat of an automobile. When the vehicle or other object carrying device 10 is subjected to acceleration or deceleration, the resulting forces acting on the massive metal ball 27 cause movement of the latter from the centered position on table 16 where it is yieldably retained by elastic elements 29 connected to casing 28.

The direction and extent of the movement of ball 27 correspond to the direction and magnitude of the acceleration or deceleration producing such movement. The movement of ball 27 is imparted to casing 28; hence the rubber tip 33 projecting from casing 28 into contact with the coated under surface of top 14 scribes or removes the coating along a line having a length and direction indicative of the extent and direction of movement of ball 27. The line scribed in the coating on the under side of top 14 can be easily viewed through the latter. The length of the line can be related to the graduated lines 35 to provide an indication or record of the relative amount or extent of the acceleration or deceleration to which device 10 has been subjected.

When it is desired to reset the device 10, the recording mechanism 26 is again secured in its central position to which it is returned by elastic elements 29, with the posts 33 in contact with top 14, and housing 11 is then again shaken to provide a new deposit or coating of powder on the under surface of top 14, thereby erasing the record or indication of accelerations or decelerations previously marked on the top 14.

It will be apparent that the above described device embodying the invention can be used to measure the extent and direction of accelerations and decelerations imposed upon automobiles, airplanes or other vehicles. Further, by reason of its simple and inexpensive construction, the device is suitable for use as an educational toy in demonstrating the effects of acceleration and deceleration, for example, to children in automobiles, as a means of entertainment and enlightenment during a trip, to indiciate the direction and extent of forces arising when the automobile starts, stops, or turns.

Although an illustrative embodiment of the invention has been described in detail herein with reference to the accompanying drawing, it is to be understood that the invention is not limited to that precise embodiment, and that various changes and modifications can be made without departing from the scope or spirit of the invention, except as defined in the appended claims.

What is claimed is:

1. A device for measuring accelerations and decelerations comprising, in combination,
    (a) a housing having a transparent top closure and containing powder adapted, upon shaking of the housing, to adhere to the under surface of said top closure for forming a coating on the latter, visible through the top,
    (b) a recording mechanism including (1) an inertia ball in rolling contact with a supporting surface in said housing, (2) a hollow casing within which said ball is disposed for movement of said casing with the ball, (3) a pointer carried by said casing for contacting the under surface of the top closure and scribing a line in said coating indicating the extent and direction of movement of said recording mechanism relative to said housing, and
    (c) elastic elements connected between said housing and said recording mechanism for yieldably urging the latter to a centered position within the housing so that, when the latter is subjected to accelerations and decelerations, the resulting forces acting on said recording mechanism produce movements of the latter from said centered position and lines are thus scribed in the coating on said top indicating the magnitude and direction of the applied accelerations and decelerations.

2. A device as in claim 1, wherein said housing has a support therein on which said ball rests, and means for adjusting said support toward and away from said top closure so as to adjust the contact pressure of said pointer against the underside of said top closure.

3. A device as in claim 2, wherein said pointer is of a flexible material, and said recording mechanism has posts projecting upwardly from said casing of a height less than the normal height of said pointer so that said posts are normally spaced from said top closure during contact of the latter by said pointer, said support being movable toward said top closure to compress said pointer and bring said posts into contact with the top closure for securely holding said recording mechanism within said housing during shaking of the latter to deposit said coating of powder on the underside of said top closure.

4. A device as in claim 2, wherein said support is spaced from the bottom and sides of said housing to define a space therebetween for accommodating said powder, and said support has holes therein to permit the powder to pass therethrough from said space during shaking of the housing.

References Cited by the Examiner

UNITED STATES PATENTS

| | | | |
|---|---|---|---|
| 2,881,276 | 4/1959 | Mintz | 200—61.45 |
| 3,002,391 | 10/1961 | Holmes | 73—517 |
| 3,022,130 | 2/1962 | Casiglia | 346—21 |
| 3,055,113 | 9/1962 | Grandjean | 346—21 |
| 3,117,455 | 1/1964 | Shepherd | 73—492 |

FOREIGN PATENTS 1,052,136   3/1959   Germany.

RICHARD C. QUEISSER, *Primary Examiner.*

ROBERT EVANS, *Examiner.*